United States Patent
Fujimura et al.

(10) Patent No.: US 7,590,262 B2
(45) Date of Patent: Sep. 15, 2009

(54) VISUAL TRACKING USING DEPTH DATA

(75) Inventors: Kikuo Fujimura, Palo Alto, CA (US);
Harsh Nanda, Redmond, WA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/106,788

(22) Filed: Apr. 21, 2008

(65) Prior Publication Data

US 2008/0212836 A1 Sep. 4, 2008

Related U.S. Application Data

(62) Division of application No. 10/857,581, filed on May 28, 2004, now Pat. No. 7,372,977.

(60) Provisional application No. 60/474,795, filed on May 29, 2003, provisional application No. 60/497,026, filed on Aug. 20, 2003.

(51) Int. Cl.
*G06K 9/00* (2006.01)

(52) U.S. Cl. ............... 382/104; 382/103; 382/106; 382/154

(58) Field of Classification Search ......... 382/103, 382/104, 154, 239, 106, 108, 181; 345/419, 345/420; 463/30
See application file for complete search history.

(56) References Cited

U.S. PATENT DOCUMENTS 5,454,043 A    9/1995   Freeman
5,581,276 A   12/1996   Cipolla et al.
5,594,469 A    1/1997   Freeman et al.
6,002,808 A   12/1999   Freeman (Continued)

FOREIGN PATENT DOCUMENTS

WO         WO 00/30023 A1        5/2000

(Continued)

OTHER PUBLICATIONS

Ahlberg, J., "Using The Active Appearance Algorithm For Face And Facial Feature Tracking", *Proc. $2^{nd}$ Int. Workshop Recognition, Analysis, and Tracking Of Faces And Gestures In Realtime Systems(RATFFG-RTS)*, pp. 68-72, 2001.

(Continued)

*Primary Examiner*—Brian P Werner
*Assistant Examiner*—Claire Wang
(74) *Attorney, Agent, or Firm*—Fenwick & West LLP; Mark E. Duell (57) ABSTRACT

Real-time visual tracking using depth sensing camera technology, results in illumination-invariant tracking performance. Depth sensing (time-of-flight) cameras provide real-time depth and color images of the same scene. Depth windows regulate the tracked area by controlling shutter speed. A potential field is derived from the depth image data to provide edge information of the tracked target. A mathematically representable contour can model the tracked target. Based on the depth data, determining a best fit between the contour and the edge of the tracked target provides position information for tracking. Applications using depth sensor based visual tracking include head tracking, hand tracking, body-pose estimation, robotic command determination, and other human-computer interaction systems.

7 Claims, 9 Drawing Sheets

U.S. PATENT DOCUMENTS

| | | | |
|---|---|---|---|
| 6,057,909 | A | 5/2000 | Yahev et al. |
| 6,128,003 | A | 10/2000 | Smith et al. |
| 6,215,890 | B1 | 4/2001 | Matsuo et al. |
| 6,720,949 | B1 | 4/2004 | Pryor et al. |
| 6,788,809 | B1 | 9/2004 | Grzeszczuk et al. |
| 6,804,396 | B2 * | 10/2004 | Higaki et al. ............... 382/181 |
| 6,819,782 | B1 | 11/2004 | Imagawa et al. |
| 6,823,080 | B2 * | 11/2004 | Iijima et al. ................. 382/154 |
| 6,907,139 | B2 * | 6/2005 | Yamamoto ................. 382/154 |
| 7,203,356 | B2 * | 4/2007 | Gokturk et al. ............. 382/154 |
| 7,415,126 | B2 * | 8/2008 | Breed et al. ................. 382/100 |
| 7,452,275 | B2 * | 11/2008 | Kuraishi ...................... 463/30 |
| 2002/0041327 | A1 | 4/2002 | Hildreth et al. |
| 2002/0181773 | A1 | 12/2002 | Higaki et al. |
| 2003/0113018 | A1 | 6/2003 | Nefian et al. |
| 2003/0156756 | A1 | 8/2003 | Gokturk et al. |
| 2004/0151366 | A1 | 8/2004 | Nefian et al. |
| 2004/0189720 | A1 | 9/2004 | Wilson et al. |
| 2004/0193413 | A1 | 9/2004 | Wilson et al. |
| 2006/0033713 | A1 | 2/2006 | Pryor |

FOREIGN PATENT DOCUMENTS

| | | |
|---|---|---|
| WO | WO 2004/097612 A2 | 11/2004 |

OTHER PUBLICATIONS

Athitsos, V., et al., "An Appearance-Based Framework for 3D Hand Shape Classification and Camera Viewpoint Estimation," Proceedings of the Fifth IEEE International Conference on Automatic Face and Gesture Recognition (FGR'02), IEEE, 2002, 8 pages.

Beymer, David J., "Face Recognition Under Varying Pose", *A.I. Memo No. 1461, Artificial Intelligence Laboratory, MIT 1993*.

Birchfeld, S., "An Elliptical Head Tracker", *Proc. 31st Asilomar Conf. Signals, Systems, and Computers*, 1997.

Bretzner, L., et al., "Hand Gesture Recognition Using Multi-Scale Colour Features, Hierarchical Models and Particle Filtering," Proceedings of the Fifth IEEE International Conference on Automatic Face and Gesture Recognition (FGR'02), IEEE, 2002, 8 pages.

Cascia, M.L., Sclaroff, S., and Athitsos, C., "Fast Reliable Head Tracking Under Varying Illumination: An Approach Based On Registration Of Texture-Mapped 3D Models", *IEEE Trans. on PAMI*, vol. 22, No. 4, pp. 322-336, 2000.

Comaniciu, D. and Meer, P., "Mean Shift: A Robust Approach Toward Feature Space Analysis", *IEEE Trans. On PAMI*, vol. 24, No. 5 pp. 1-18, 2002.

Edwards, J., Taylor, C.J., and Cootes, T.F., "Learning To Identify And Track Faces In Image Sequences", *In Proceedings Of The International Conference On Face And Gesture Recognition*, pp. 260-265, 1998.

Feris, R. S., Cesar Jr., R.M., "Tracking Facial Features Using Gabor Wavelet Networks", *Proc. Brazilian Conference On Computer Graphics, Image Processing-Sibgrapi00, IEEE Computer Society Press*, pp. 22-27, 2000.

Fukunaga, K., "Introduction To Statistical Pattern Recognition", Academic Press, 1990.

Gavrila, D. M., et al., "Real-Time Object Detection for "Smart" Vehicles," The Proceedings of the Seventh IEEE International Conference on Computer Vision, Sep. 20-27, 1999, 10 pages.

Gee and Cipola, "Determining The Gaze Of Faces In Images",*Image and Vision Computing*, vol. 12, No. 10, pp. 639-647, 1994.

Gvili, R., et al., "Depth Keying," SPIE Elec. Imaging, 2003, 11 pages.

Henry, M.H., Lakshmann, S. and Watta, P., "Optical Flow Prepossessing For Pose Classification And Transition Recognition Using Class-Specific Principle Component Analysis", Proc. Of IEEE Intelligent Vehicles Symposium, Jun. 2003, Columbus OH 604-609.

Huang,, K.S., Trevedi, M.M. and Gandhi, T., "Driver's View And Vehicle Surround Estimation Using Omnidirectional Video Stream", Proc. Of IEEE Intelligent Vehicles Symposium, Jun. 2003, Columbus OH, 444-449.

Huttenlocher, D., Klanderman, G and Rucklidge, W.J., "Comparing Images Using The Hausdorff Distance", *IEEE Transactions On Pattern Analysis And Machine Intelligence* 15(9):850-63, 1993.

Iddan, G.J. and Yahav, G. "3D Imaging In The Studio", *SPIE*, vol. 4298, pp. 48, Apr. 2001.

Ishibuchi, K., et al., "Real Time Vision-Based Hand Gesture Estimation for a Human-Computer Interface," Systems and Computers in Japan, 1997, pp. 76-88, vol. 28, No. 7.

Ji, Q. and Yang, X., "Real Time 3D Face Pose Discrimination Based On Active IR Illumination", *Int. Conf. On Pattern Recognition*, pp. 310-313, 2002.

Jojic, N., et al., "Detection and Estimation of Pointing Gestures in Dense Disparity Maps," Fourth IEEE International Conference on Automatic Face and Gesture Recognition, Mar. 28-30, 2000, 15 pages.

Kamiji, K., Kawamura, N., "Study Of Airbag Interference With Out Of Position Occupant By the Computer Simulation", 2000.

Krueger, V., Bruns, S. and Sommer, G., "Efficient Head Pose Estimation With Gabor Wavelet Networks", *BMVC*, 2000.

Lee, C., et al., "Online, Interactive Learning of Gestures for Human/Robot Interfaces," Proceedings of the 1996 IEEE International Conference on Robotics and Automation, Apr. 1996, pp. 2982-2987.

Malciu, M., Prteux, F., "A Robust Model-Based Approach For 3D Head Tracking In Video Sequences", *International Conference On Automatic Face And Gesture Recognition*, 2000.

Malassiotis, S., et al., "A Gesture Recognition System Using 3D Data," Proceedings of the First International Symposium on 3D Data Processing Visualization and Transmission (3DPVT'02), IEEE, 2002, pp. 1-4.

McKenna, S.J., Raja, Y., and Gong, S., "Object Tracking Using Adaptive Colour Mixture Models", *Lecture Notes in Computer Science*, 1998.

Moller, M. F., "A Scaled Conjugate Gradient Algorithm For Fast Supervised Learning", *Neural Networks*, vol. 6, pp. 525-533, 1993.

Morency, L.P., Rahimi, A., Checka, N., Darrell, T., "Fast Stereo-Based Head Tracking For Interactive Environments", *Face and Gesture*, 2002.

Neflan, A.V. and Hayes, III, M.H., "Face Detection And Recognition Using Hidden Markov Models", *proc. IEEE Int'l. Conf. Image Processing*, vol. 1, pp. 141-145, 1998.

Nishihara, H.K., Huber, Thomas, H.J., Huber, E., "Real-Time Tracking Of People Using Stereo And Motion", *SPIE Proceedings*, vol. 2183, pp. 266-273, 1994.

Oka, K., et al., "Real-Time Tracking of Multiple Fingertips and Gesture Recognition for Augmented Desk Interface System," Proceedings of the Fifth IEEE International Conference on Automatic Face and Gesture Recognition (FGR'02), IEEE, 2002, 12 pages.

Osuna, E., Freund, R., and Girosi, F., "Training Support Vector Machines: An Application To Face Detection", *Proc. IEEE Computer Society Conf. Computer Vision And Pattern Recognition*, pp. 130-136, 1997.

Pappu, R., Beardsley, P.A., "Qualitative Approach To Classifying Gaze Direction", *International Conference On Automatic Face And Gesture Recognition*, 1998.

Pardas, M., Sayrol, E., "A New Approach To Tracking With Active Contours", *Proceedings. 2000 International Conference of Image Processing*, vol. 2, pp. 259-262, 2000.

Pavlovic, V. I., et al., "Visual Interpretation of Hand Gestures for Human-Computer Interaction: A Review," IEEE Transactions on Pattern Analysis and Machine Intelligence, Jul. 1997, pp. 677-695, vol. 17, No. 7.

Polat, E., et al., "Robust Tracking of Human Body Parts for Collaborative Human Computer Interaction," Computer Vision and Image Understanding, 2003, pp. 44-69, vol. 89.

Potzsch, M., Kruger, N. and von der Malsburg, C., "Determination Of Face Position And Pose With A Learned Representation Based On Labeled Graphs", Image And Vision Computing vol. 15, No. 8, pp. 665-673, 1997.

Redert, A., et al., "ATTEST: Advanced Three-Dimensional Television System Technologies," IEEE Computer Society, Proceedings of the First International Symposium on 3D Data Processing Visualization and Transmission (3DPVT'02), 2002, 7 pages.

Rowley, H.A., Baluja, S., and Kanade, T., "Neural Network-Based Face Detection", *IEEE Trans. Pattern Analysis And Machine Intelligence*, vol. 20, No. 1, pp. 23-28, Jan. 1998.

Russaknoff, D., and Herman, M., "Head Tracking Using Stereo", *Machine Vision And Application*, vol. 13, pp. 164-173, 2002.

Sakagami, Y., et al., "The Intelligent ASIMO: System Overview and Integration," Proceedings of the 2002 IEEE/RSJ, Intl. Conference on Intelligent Robots and Systems, IEEE, 2002, pp. 2478-2483.

Sako, H., et al., "Real-Time Facial-Feature Tracking Based On Matching Techniques And Its Applications", *Proceedings of The 12th IAPR International Conference On Pattern Recognition*, pp. 320-324, 1994.

Shao, x., Huang, J., Li, D., and Weschler, H., "Pose Discrimination And Eye Detection Using Support Vector Machines", Proc. of 14th International Conference on Pattern Recognition, 1998.

Srinivasan, S., and Boyer, K., "Head Pose Estimation Using View Based Eigenspaces", *Int. Conf. On Pattern Recognition*, pp. 302-305, 2002.

Starner, T., et al., "Real-Time American Sign Language Recognition Using Desk and Wearable Computer Based Video," IEEE Transactions on Pattern Analysis and Machine Intelligence, Dec. 1996, pp. 1371-1375, vol. 20, No. 12.

Stiefelhagen, R., Finke, M., Yang, J. Waibel, A., "From Gaze To Focus Of Attention", *Lecture Notes In Computer Science*, vol. 1614, pp. 761-768, Jun. 1999.

Stiefelhagen, R., Yang, J., Waibel, A., "Tracking Focus Of Attention For Human-Robot Communication", *International Conference On Humanoid Robots*, 2001.

Sung, K.K., and Poggio, T., "Example-Based Learning For View-Based Human Face Detection", *IEEE Trans. On Pattern Analysis And Machine Intelligence*, vol. 20, No. 1, pp. 39-51, Jan. 1998.

Takemura, K., Ido, J., Matusmoto, Y., Ogasawara, T., "Drive Monitoring System Based On Non-Contact Measurement System Of Driver's Focus Of Visual Attention", Proc. Of IEEE Intelligent Vehicles Symposium, Jun. 2003, Columbus OH, 581-586.

Vogler, C., et al., "ASL Recognition Based on a Coupling Between HMMs and 3D Motion Analysis," Sixth International Conference on Computer Vision, Jan. 4-7, 1998, pp. 363-369.

Wechsler, H., "Face Recognition: From Theory And Application", Springer, pp. 528-536, 1998.

Wilson, A. D., et al., "Parametric Hidden Markov Models for Gesture Recognition," IEEE Transactions on Pattern Analysis and Machine Intelligence, Sep. 1999, pp. 884-900, vol. 21, No. 9.

Yang, M., Kriegman, D., and Ahuja, N., "Detecting Faces In Images: A Survey", *IEEE Transaction on Pattern Analysis and Machine Intelligence*, vol. 24, No. 1, pp. 34-58, 2002.

Yang, R., Zhang, Z., "Model-Based Head Pose Tracking With Stereovision", *International Conference On Automatic Face And Gesture Recognition*, 2002.

Zhu, Y., et al., "3D Head Pose Estimation with Optical Flow and Depth Constraints," IEEE Computer Society, Proceedings of the Fourth International Conference on 3-D Digital Imaging and Modeling (3DIM'03), 2003, 6 pages.

Zhu, Y., et al., "A Real-Time Approach to the Spotting, Representation, and Recognition of Hand Gestures for Human-Computer Interaction," Computer Vision and Image Understanding, 2002, pp. 189-208, vol. 85.

Zhu, X., et al., "Segmenting Hands of Arbitrary Color," Proceedings of the Fourth IEEE International Conference on Automatic Face and Gesture Recognition, Mar. 28-30, 2000, pp. 446-453.

* cited by examiner

VISUAL TRACKING USING DEPTH DATA

RELATED APPLICATIONS

This application is a divisional application under 35 U.S.C. §121 of, and claims priority under 35 U.S.C. §120 from, co-pending U.S. patent application Ser. No. 10/857,581 entitled "Visual Tracking Using Depth Data," filed on May 28, 2004, which claims priority under 35 U.S.C. § 119(e) from, U.S. Provisional Patent Application Ser. No. 60/474, 795, titled "Head Tracking Using Depth Data," filed on May 29, 2003, and from Ser. No. 60/497,026, titled "Illumination Invariant Driver Monitoring: Head Tracking, Head Pose, and Body Lean Estimation," filed on Aug. 20, 2003, which are incorporated by reference herein in their entirety.

FIELD OF THE INVENTION

The present invention relates generally to real-time computer vision and more particularly to computer based visual tracking of moving targets.

BACKGROUND OF THE INVENTION

Tracking is a key component for many areas of real-time computer vision such as Human-Computer Interaction ("HCI"). One example of an HCI application is driver monitoring. In this area, work has been done to determine head pose and body lean using various techniques. This information can be used for example to assist an air-bag deployment system, or for attention and fatigue monitoring in a safety system. Tracking spatial location of the driver's head or other body parts facilitates the operation of these and other HCI systems.

Conventional tracking systems are typically based on two-dimensional (2D) gray or color images. There are situations in which methods using templates or probabilistic frameworks do not function very robustly. Conventional tracking algorithms often fail when the environment is cluttered. The algorithms fail because the hypothesis being examined often cannot distinguish the real target. Distractions by edges caused by non-target environmental objects are major contributors to this problem even though the target object may have distinct depth difference compared to its surroundings (e.g., background). For example, this effect is common in many important tracking applications including head tracking, human tracking, and hand gesture recognition. Accordingly, using conventional systems, distinguishing a target object in the foreground from other objects in the background is not a trivial task.

This problem common to conventional tracking methods is basically that the target tends to get lost when the environment has a cluttered background. A similar problem arises when changing lighting conditions distract contours or patterns that tracking algorithms are based on. There have been many different approaches to solving the tracking problems. Some conventional systems use contour information, while others use depth from stereo imaging systems, intensity and color distribution, or a combination of these features.

Some systems have attempted to use depth characteristics of the target to aid in the tracking functions. For example, stereo (dual camera) systems are used to track heads with a model-fitting approach. Some of these systems use stereoscopic images, but still rely on other intensity-based information, or if using stereoscopic images only, it is used with a computationally intensive algorithm.

Thus, there is a need for tracking methods and systems that are based on (1) real-time image data, (2) using algorithms that are not computationally intensive, and (3) using simple single-camera systems.

SUMMARY OF THE INVENTION

A computer-based method for real-time tracking of a target using a depth-sensing camera is described. The method involves the reception of depth information in a real-time video image stream. The video depth information includes an image of the target to be tracked. Based on the depth information, the edge of the target's periphery in the depth image is found. Then, a mathematically representable contour that models the target's shape is fit at different locations in the image to find the best fit with respect to target's edge. The contour and its location within the image provide the tracking of the target.

A human-computer interaction system based on these principles of operation can visually track human movement as computer control input. The system includes an active depth sensor for capturing depth images of the human. A processing unit receives the depth images and derives the control input information. To do this, the processing unit includes an edge detection module that is configured to determine, from the image data, which pixels correspond to the edge of the human to be tracked. Then, a tracking module using a contour that models the human (or human body part) to be tracked determines how to best fit the contour with respect to the edge in the image. Based on the best fit, a position of the target within the captured depth images is provided. This position information can be then used to, for example, use other machine vision techniques to recognize hand signs, arm motions, or the like, corresponding to computer commands.

Further, the human-computer interaction system can also include a body-lean determination module to receive the position information and to calculate an average distance of one or more body parts with respect to the active sensor. Then, by relating the average distance of each body part with respect to other body parts the module determines body-lean information. The body-lean information can be used, for example, in a vehicle control unit to control air-bag deployment.

In one embodiment, a motor vehicle is configured to track occupant body-lean information for multiple purposes. The motor vehicle is equipped with an active depth sensor for capturing depth images of the occupants. A processing unit with an edge detection module and a tracking module similar to the modules described above can provide tracking data to other control logic in the motor vehicle. The tracking data can be used for driver assist technology, air-bag deployment, or the like.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Figure 1A:
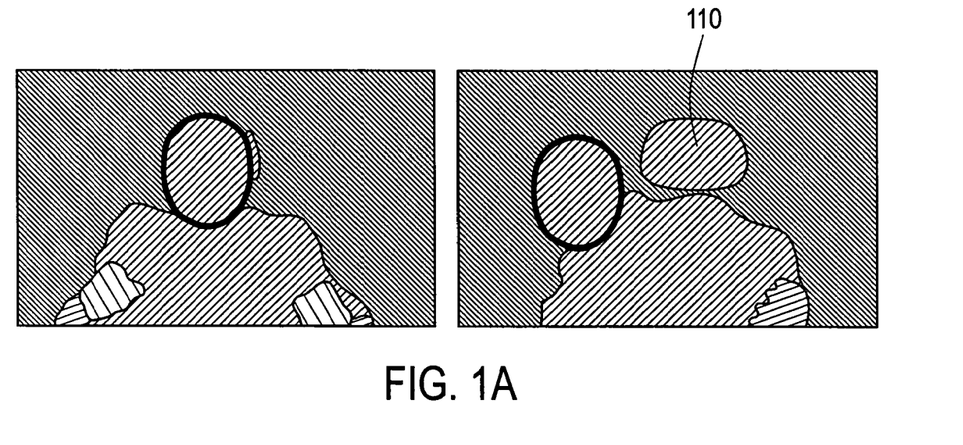
FIG. 1A shows depth images of a driver with different positions for the upper torso.
Figure 1B:
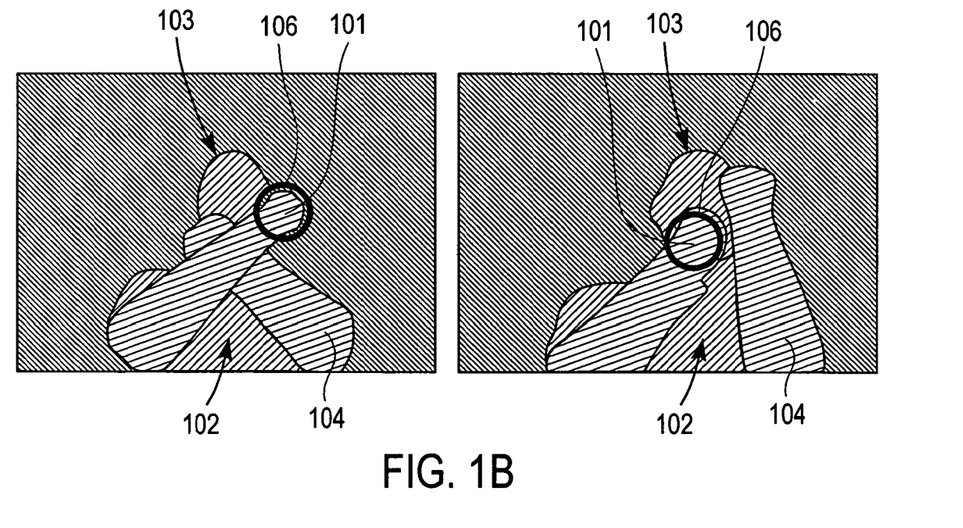
FIG. 1B shows output images of one embodiment of a tracker in which the right hand of a person is the tracked target.

Referring now to Figure ("FIG.") 1A, depth images of a driver with different positions for the upper torso are shown with the output of an elliptic tracking system. A depth image is visually represented with variations in the pixel intensity based on the depth value, that is, the objects closer to the camera appear brighter and progressively darker until the background outside a depth window is shown as black. A depth sensor can be set to capture or sense depth information for objects within a specified depth range or depth window. When this is done in real-time and a stream of depth images or frames are produced, the depth sensor functions as a motion picture camera, e.g., video, film, digital video, or the like, but it outputs hybrid image data. The hybrid image data includes depth data for each pixel; for example, data for a hybrid or depth image generally includes pixel coordinates, color values, depth value and other conventional image data. One benefit of using a depth-sensing camera is the ability to set a depth window by controlling shutter speed. For example, FIG. 1B shows output images of one embodiment of a tracker in which the right hand of a person is the tracked target. As shown in the images, target right hand 101 is tracked while body 102 and head 103 of the person are at the edge of the depth window leaving anything behind it outside to avoid cluttering the depth information with non-tracked objects. As another example, in a driver's pose tracking application (for example as shown in FIG. 1A), the camera can be set to a depth window that ranges from the steering wheel area (Dmin) to the headrest of the driver seat 110 (Dmax) thereby avoiding cluttering the depth information with, for example, depth data from back-seat passenger movement.

Figure 2:
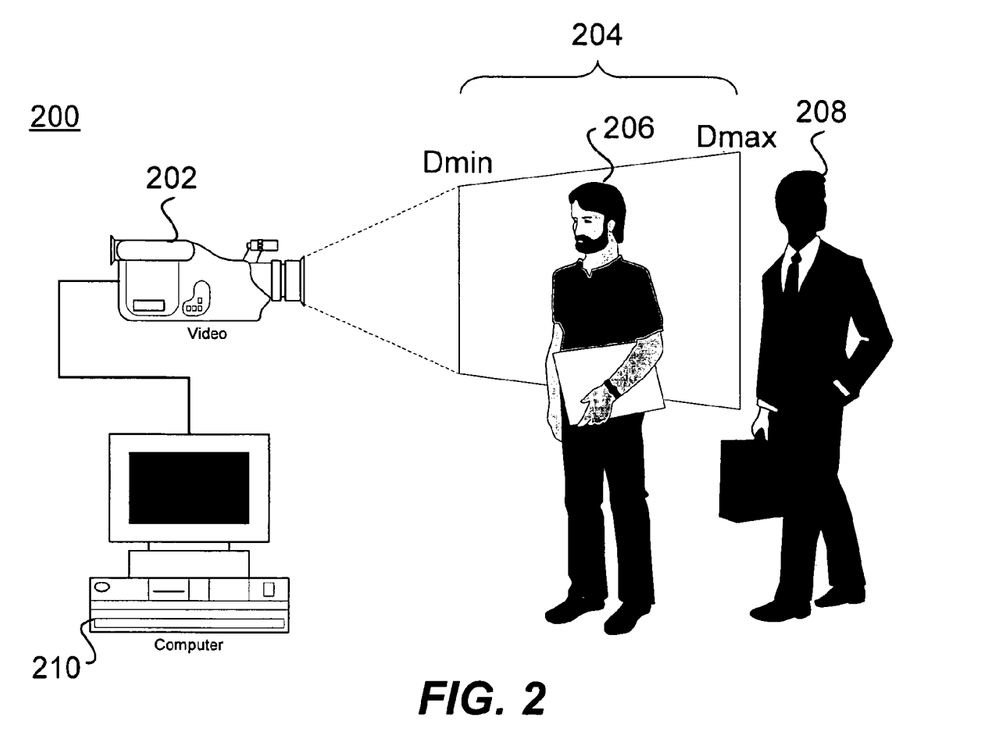
FIG. 2 shows one embodiment of a sample tracking system using a depth-sensing camera.

FIG. 2 shows a sample tracking system using a depth-sensing camera. Depth-sensing cameras 202 operate according to the time-of-flight principle, hence the name: time-of-flight cameras. One embodiment of a tracking system 200 includes one time-of-flight camera 202, such as, for example, a camera manufactured by 3DV Systems, of Yokneam, Israel, or Canesta, Inc., of San Jose, Calif. The time-of-flight camera 202 is set to a depth window 204 that includes the area from Dmin to Dmax in which the target 206 being tracked will move about. One benefit of this approach is that non-target objects 208, e.g., background objects, do not produce depth image information. The depth-sensing camera 202 is connected to the tracking computer 210. In one embodiment, the tracking computer 210 includes an image processing library, such as for example, Intel's image processing library, from Intel Corporation of Santa Clara, Calif., and runs at 14 frames per second (320×240 pixels) on a 1.2 GHz Pentium III processor by Intel Corporation. In another embodiment, the depth-sensing camera 202 is part of a robotic vision unit and the tracking computer is a module within the control logic in a robot, for example, the ASIMO humanoid robot by Honda Motor Co., Ltd, of Tokyo, Japan. Yet another embodiment includes a small time-of-flight camera 202 in a vehicle cabin connected to a tracking module 210 in a data processing control unit within the vehicle, for example, for controlling air-bag deployment.

The depth cameras 202 based on the time-of-flight principle can capture depth and color information simultaneously using the same optical axis in real-time. Moreover, time-of-flight cameras provide the advantageous feature of setting a depth window 204 that corresponds to a range of operation (Dmin, Dmax) for which depth information is to be recorded. This unique feature eliminates background clutter by setting Dmax immediately behind the subject or target 206 being imaged, in effect, removing objects beyond certain depth from the image acquired.

The image capturing method is based on active sensing with a time-of-flight camera 202, where a pulse of infrared illumination is projected to the target 206 and the sensor reads its echo signal reflected from the target 206. Furthermore, the device has a high-speed shutter by which it controls the sensing scope for targets whose signal can enter the sensor, i.e., the depth window 204. For a far object 208, the echo reaches the device only after the shutter has been closed. Thus, no signal is recorded for the corresponding object, i.e., most background objects 208 do not appear in the recorded scene.

Compared to stereoscopic systems, a depth-sensing tracking system 200 includes several improved characteristics. For example, the image is illumination-invariant in in-door environments, as long as the environment does not contain light of the same wavelength used for the pulse of the sensor. The performance over any given range is improved over the stereoscopic system; any error in depth is approximately 5~15 mm for 0.5~3 m depth window 204. Depth information can be recorded in real time in a separate corresponding depth image (e.g., 8 additional bits for each pixel). This definition provides sufficient separation between image elements, such as, for example hand and rest of the body in a system 200 used for gesture recognition. In addition, both depth and color information are captured at real-time speed (e.g., 30 frames/sec), in effect producing a depth and a color image of the same scene. The depth sensing performance for objects with no texture (such as walls) is much better than stereoscopic systems that cannot differentiate between the images of each camera. All these improved features and other features are provided with a single camera tracking system 200 as opposed to a multi-camera stereoscopic system. The single camera system 200 also provides the additional benefit of obviating the need for calibration between the two or more cameras of a conventional stereoscopic multi-camera system.

Potential Fields

Figure 3:
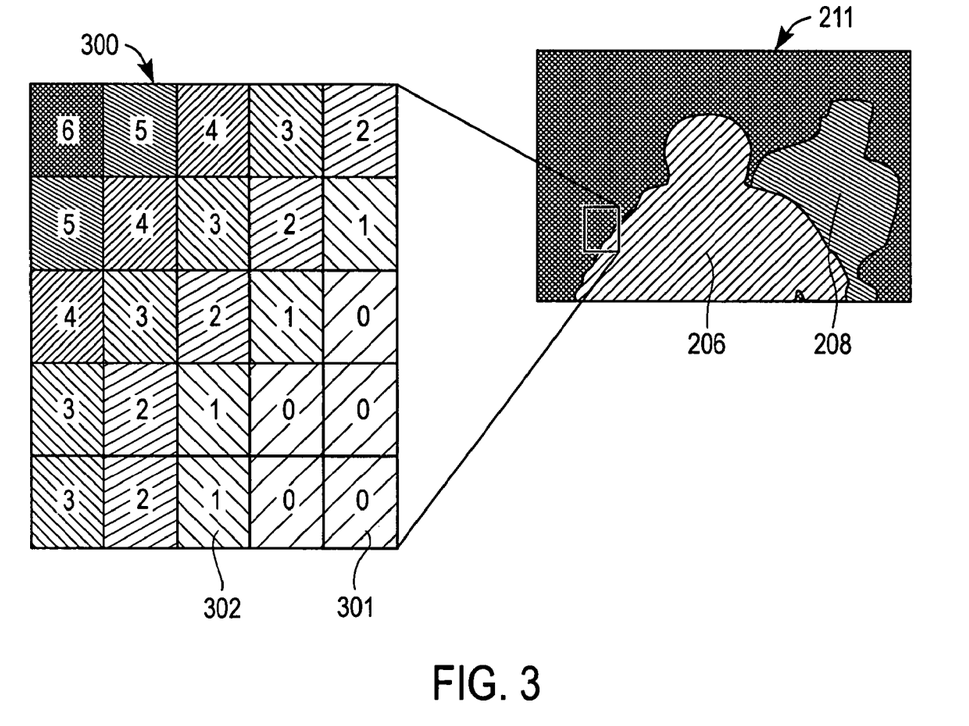
FIG. 3 shows a depth image with a corresponding sample edge potential transform map.

Now referring to FIG. 3, a depth image with a corresponding sample edge potential transform map is shown. The transform map 300 includes the target 206 to be tracked modeled as an attractor in a potential field. Each point 302 outside of the target's edge is associated with a value indicating how far the point is from the target's edge 301, which is given a reference value (e.g., "0" potential). Since the exact position of the attractor is not known, i.e., this is what is being tracked, an approximate potential field is generated by using image edges. There are several variations for potential functions that define the shape of the "landscape" (represented as the potential field). In one embodiment, a distance transform is used to provide a fast computation. Specifically, distance D between a point p and a set of points Y is defined as the Manhattan distance between p and the point in Y that is closest to p (i.e., the point in the outline of the target's edge 301 that is closest to the outside point 302 for which the distance D is calculated):

$$D(p, Y) = \min_{y \in Y} \|p - Y\|$$

With this metric, a potential field can be determined where each point 301 in the target's edge has a reference value, for example, a value of "0" potential, and every point 302 outside the target's edge has a D value, for example, corresponding to its Manhattan distance to the closest edge point 301 as shown in FIG. 3. A visual representation of a profile defined by a set of potential values is shown in FIG. 4A.

Figure 4A:
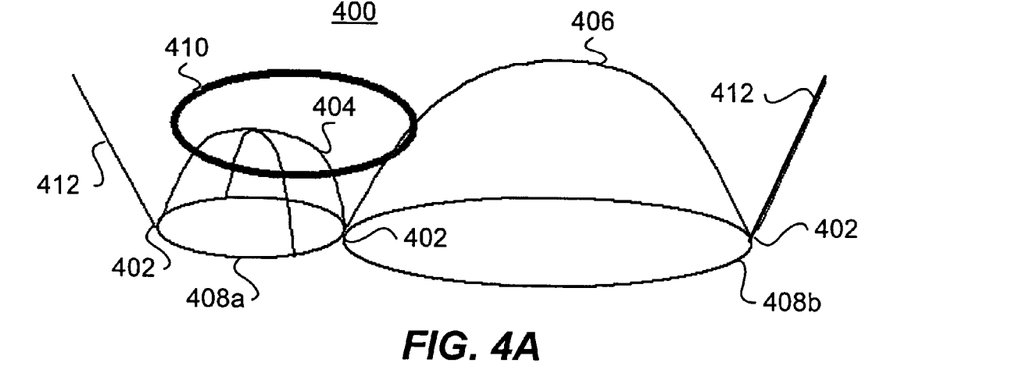
FIG. 4A shows a visual representation of a profile defined by a set of potential values.

FIG. 4A shows a profile or "landscape" 400 of the potential field corresponding to the depth image of the target. The lowest points or valleys 402 correspond to the edge points 301 of the target in the corresponding depth image. The other points in the profile are graphical representations of the potential values (e.g., D) for the neighboring points in the depth image. Thus, for example, the representation of the target's head 404 can be detected and differentiated from the target's body 406 as the "hill" 404 completely surrounded by "valleys." Concentric equidistant lines of points can be defined reaching a local maxima at the top of the "hill" corresponding to the points 302 furthest away from the edge points 301. In the opposite direction, points 302 generally increase in a gradual slope 402 towards the image edges. The "valleys" 402 are formed by the edge points 301 and make up the lowest potential zone 408 that can be fit with a mathematically representable contour 410, in this sample embodiment an ellipse. An analysis of the image data as further detailed below can yield the coordinates of the image (search area S) likely to include the target. Thus, for example, in FIG. 4A, if a person's head, as opposed to the body, is to be tracked (i.e., the head is the target), the search area S would not include the right side of the profile 400. Thus, by using the general search area S restriction, only the low potential zone 408a would meet this restriction and the low potential zone 408b corresponding to the body can be ignored.

As with the potential field calculation, a measure of the proximity between the outline 410 and the low potential zone 408a can be given by a distance metric. For example, if the points of the mathematically representable contour 410 (X) are taken as a whole to be compared with the set of points 301 (Y) that make up the target low potential zone 408a, in one embodiment, the distance between the two point sets X (e.g., contour 410) and Y (e.g., target's edge 408a) is defined as what sometimes is referred to as Chamfer Distance:

$$\text{dist}(X,Y) = \Sigma_{x \in X}(x,Y)/|X|$$

where the Manhattan distance D between each point x in set X to set Y is added over the set of points in X. This measure can be used for comparison between several "best guess" outline 410 locations or states to determine the best fit as described below.

An algorithm for tracking a target according to one embodiment includes the following metric:

$$s_{t+1} = \arg\min_{s \in S}(\text{dist}(s, I_{t+1}))$$

In this embodiment, s corresponds to a state of the contour 410, while S is the search space for the contour s containing all possible states s can take in the neighborhood of s's current state. The symbol I is used to represent the edge map 400 corresponding to a particular depth image or frame. For the first frame the position of the target s is estimated and for subsequent frames, the final position from previous image $s_t$ is used to determine a search area in the neighborhood of the $s_t$ position to find the next target state s at t+1, i.e., $s_{t+1}$.

For each candidate target state s, the overall fit of the contour 410 to the actual target edge 408a is assessed and the one that has the least overall match value (potential) is selected as the best fit. For example, the match value can be the sum of point distances dist( ) from the edge points 408a (Y) to the contour 410 (X). For the contour 410, any of a number of mathematically representable shapes or curves can be used, such as for example, ellipses, rectangles, squares, ovals, free-form curves, or the like. In one embodiment, an ellipse is used due to the ease of change of its location and size using a fixed aspect ratio for its axis.

Elliptic Head Tracking

In one embodiment for head detection and tracking, the projection of a human head in 2D is modeled as a vertical ellipse with a fixed aspect ratio of 1.2. That is, an ellipse with major axis h and minor axis $$\frac{h}{1.2}.$$

Thus, at any given moment, the state of the head (ellipse) s is represented by a triplet (x,y,h) where (x,y) is the position of the center of the head in the image coordinate system and h is the height of the major axis of the ellipse used to model the projection of the head in the image. In other embodiments, the tracked target can be modeled by any mathematically representable outline with a state s, for example, a center position and a radius, e.g., circle (x, y, c), a center position and a side length, i.e., square (x, y, l), or any other position and related mathematical relationship between a set of points (i.e., contour 410). In this embodiment, head tracking is done by trying to optimize the ellipse measure as discussed bellow, in a search space S in the neighborhood of the predicted head state.

Figure 4B:
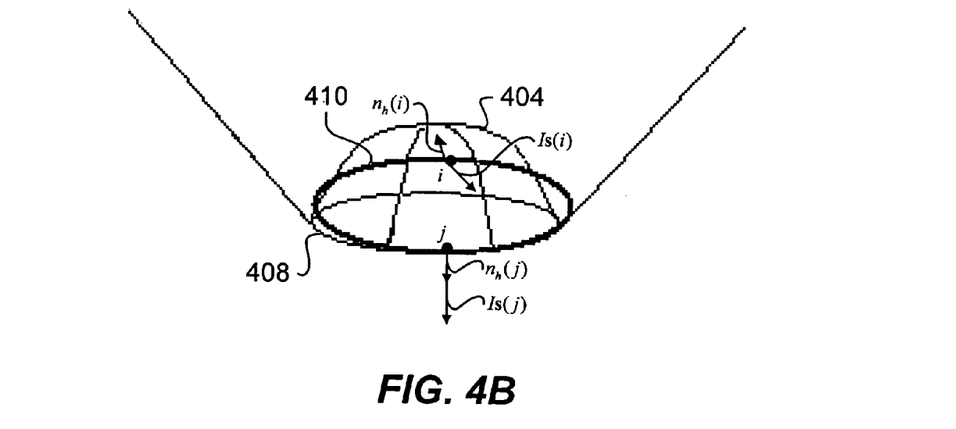
FIG. 4B shows a visual representation of a profile defined by a set of potential values corresponding to an elliptic head tracking embodiment.

Now referring to FIG. 4B, an elliptic head tracking embodiment is shown. Given an ellipse 410 state s=(x,y,h) and a gradient image I 408 corresponding to a depth image D, the ellipse measure of s with respect to I gives a measure of an ellipse of size h, at position (x,y) in the image I. In one embodiment, a measure for this ellipse is the measure proposed by Nishihara et al. in "Real-time Tracking of People Using Stereo and Motion," SPIE Proceedings, Vol. 2183

(1994), incorporated herein by reference in its entirety. Thus, the ellipse measure of state s is given by:

$$EM(s, I) = \frac{1}{N_h} \sum_{i=1}^{N_h} |n_h(i) \cdot I_s(i)|$$

where Is(i) is the depth gradient, at the ith perimeter pixel of the ellipse in state s in the image I. $N_h$ is the number of pixels on the periphery of an ellipse of size h. $n_h(i)$ is the unit vector, normal to the ellipse of size h at the same ith perimeter pixel as above and "." denotes a dot product. This measure takes gradient direction and magnitude of depth discontinuity into account. As shown in FIG. 4B with respect to two points i and j, the measure EM is proportional to the depth gradient's magnitude and alignment with the ellipse's periphery as measured by the dot product. For example, when the ellipse state s coincides with the outline of the target head I (e.g., point j), at each such point of the ellipse periphery the unit vector $n_h(j)$ has the same direction as the depth gradient vector Is(j) (i.e., cos 0°=1), thus, the EM measure is proportional to the magnitude of the depth gradient vector (i.e., $n_h(j) \cdot Is(j) = |n_h(j)||Is(j)|\cos 0°$). In addition, the more perfectly matching points, i.e., the better the fit between the contour and the target's edge in the image, the greater the EM value since the magnitude of the gradient is the greatest at the target's edge due to the large variation in depth with respect to the background. Accordingly, the best fit amongst a set of possible states can be determined by comparing the resulting EM values are discussed below.

For tracking purposes, given the state $s_t = (x_t, y_t, h_t)$ and $s_{t-1} = (x_{t-1}, y_{t-1}, h_{t-1})$, of the head at time t and t−1 respectively, the position of the head at time t+1 is predicted using a constant velocity assumption. The size of the head is predicted to stay the same.

$x'_{t+1} = x_t + (x_t - x_{t-1})$ $y'_{t+1} = Y_t + (y_t - y_{t-1})$ $s'_{t+1} = (x_{t+1}, y_{t+1}, h)$

This simple motion model greatly improves the performance of the tracker system by removing any restriction of the lateral velocity of the head. Although, the constant velocity model restricts the amount of acceleration, the robust input features and the large enough window of search compensate for that. For head size, it has been observed in practice that it changes very gradually and does not obey the constant change model. The search space S does take gradual and occasional variations of head size into account.

The ellipse measure EM is calculated for all states in the search space S, (where S contains all states within some range of the predicted state $s'_{t+1}$) with respect to the gradient image I at time t+1. The state corresponding to the maximum ellipse measure in this search is chosen as the state of the head in frame t+1.

$s_{t+1} = \max EM(s, I_{t+1}) s \in S$

In FIG. 4B, the contour 410 "falls" to the low potential valley 408 corresponding to the edge of the target 404 because the best fit (maximum EM) will correspond to the state in which the distance measure from the contour 410 to the edge 408 is minimized, that is, when the points of the contour 410 periphery coincide with the points of the target edge 408.

In addition, in one embodiment, a confidence measure (CM) is calculated to prevent drifting, e.g., as a basis to stop the tracking system or initiate a detection module to provide a new estimated location of the target head. The confidence measure for a state s with respect to an image I is defined as:

$$CM(s, I) = \frac{EM(s_{t+1}, I) - \min EM(h_{t+1})}{\max EM(h_{t+1}) - \min EM(h_{t+1})}$$

where max $EM(h_{t+1})$ and min $EM(h_{t+1})$ are the maximum and minimum values of EM observed so far for an ellipse of size $h_{t+1}$. If the confidence measure goes below a predetermined threshold, appropriate action is taken (e.g., stop tracker, start detection module, or the like).

Component Based Potential Field Tracking

An alternative embodiment, especially suitable for object tracking where depth information is used, implements a component based tracking method. As opposed to non-component based embodiments, the 'sides' of the target's edge are differentiated, namely, contour 410 is attracted to edge fragments of the target edge 408 depending on which side is higher (farther from the camera) or lower (closer to the camera). For an edge in a depth map, its orientation is defined in a natural way based on which side of the edge 480 contains higher values in depth; higher values in depth correspond to the outer side of the edge while lower values in depth correspond to the inner side, i.e., part of the target itself.

For example, contour 410 (e.g., a set of points X defining an ellipse, a rectangle, a square, a circle, or the like) is divided into k parts (e.g., a k-sided ellipse), where k is typically an even number, (e.g., 2, 4, 8, or the like). Each of the k parts is defined with an outer side (higher depth values) and an inner side (lower depth values) such that pixels within the same part are of similar orientation. Each part is matched against edge segments of the target's edge 408 only when their orientations match. That is, when the depth values to the outer side are larger than the depth values to the inner side of the edge segment. This way, the likelihood of correct a match is highly increased, particularly when there are many spurious edges in the neighborhood of the target.

The calculation dist ( ) is applied k times, one each for each orientation. For example, in one embodiment, $I^i$ and $s^i$ represent the edge image corresponding to the i-th orientation and part of s with the i-th orientation, respectively. That is, the plurality of edge images $I^i$ (and parts $s^i$) are mutually disjoint ($I = \cup I^i$, and likewise $s = \cup s^i$). Then, the tracking method according to this embodiment includes the following expression:

$s_{t+1} = \arg \min_{s \in S} (\Sigma_i \text{dist}(s^i, I^i_{t+1}))$

In addition, in one embodiment weights can be assigned to the k parts or components to represent the significance for the orientation for a particular target. For example, human tracking should have more weights on vertical sides than horizontal sides.

Figure 5:
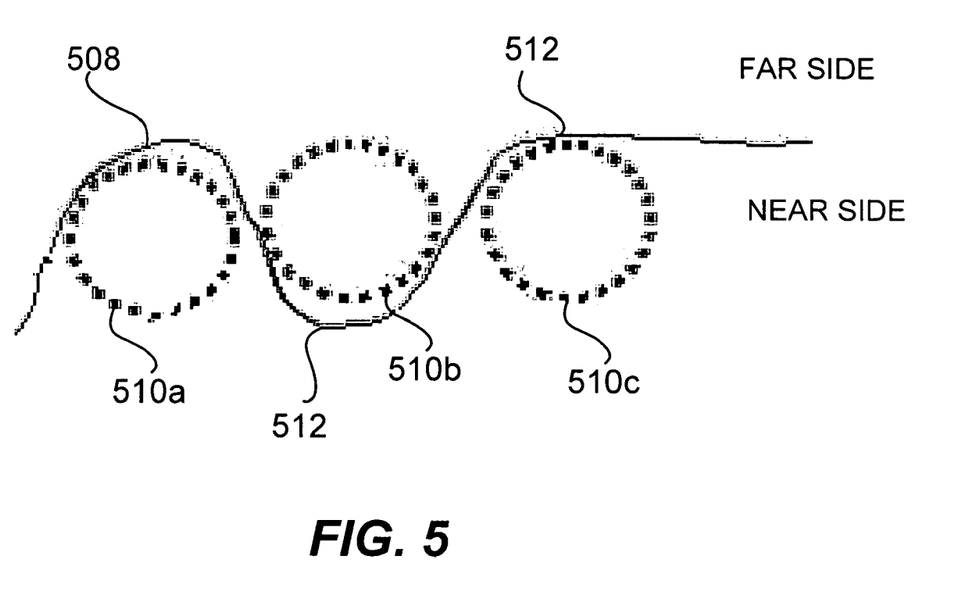
FIG. 5 shows a simple scene that contains just two regions (upper far area and lower near area) and a set of alternative tracking outputs.

Now referring to FIG. 5, a simple scene that contains just two regions (upper far area and lower near area) is shown. Suppose that contour 510 at position (a), (shown as 510a) is the correct match for the tracked target 508. The contour 510 at position (b) (shown as 510b), is a mismatch, but could be considered as a match in embodiments that do not distinguish edge orientation. Contour 510 at position (c) (shown as 510c), is also a mismatch, but it is considered as a local minimum whose evaluation for a search area S that estimates $s_{t+1}$ to be in that general area is lower than at position (a). For the non-component-based embodiments, contours at positions (a) 510a and (b) 510b will get an approximately equal "match score." However, according to the present embodiment, contour 510b will be discarded since it does not meet the proper orientation for each of the parts of the contour $s^i$. For example, giving higher weight values to match scores corresponding to parts of the contour that matched the target at the wrong orientation would make contour 510a at position (a) have the overall minimum match score out of the three contour positions shown.

Figure 6:
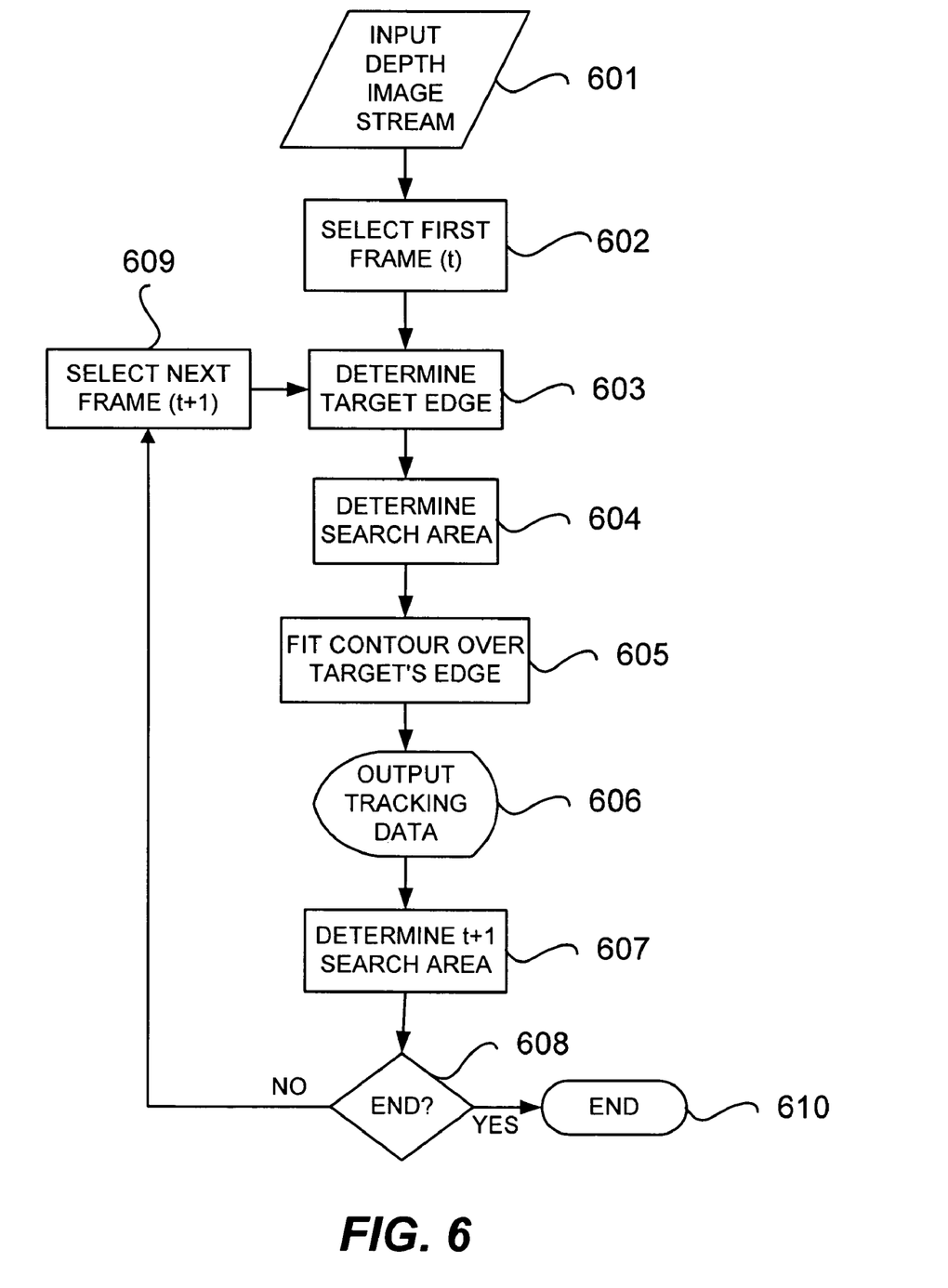
FIG. 6 shows one embodiment of a tracking method.

Now referring to FIG. 6, one embodiment of a tracking method is shown. According to this embodiment, a video depth image stream is received 601 as input. A first frame of the stream is selected for processing 602. For the first frame, the edges of the target to be tracked are determined 603. Based on the determined edges the general search area for the target is determined 604. Within the search area and based on a corresponding potential field, a contour is fit 605 over the target's edges. For example, six alternative states each with a corresponding elliptic fit are produced. From amongst these six states, the best fit is selected. Once the "best fit" or optimal match is determined between the contour and the target's edge, the tracking data is output 606 for example as an image coordinate value (x, y) and the associated modeling contour (e.g., h for an ellipse contour). The estimated next frame search area S is determined 607. The search area S is chosen stochastically or deterministically in the neighborhood of the predicted target position in the next frame. The predicted position is based on a constant velocity assumption, for example, using a Kalman filter. Unless a termination command is provided 608, the next frame is selected 609 and the fitting process is repeated. The search area determination 604 with subsequent frames involves matching the predicted search area to the current image frame. Once a termination command is received 608, the tracking ends 610.

Figure 7:
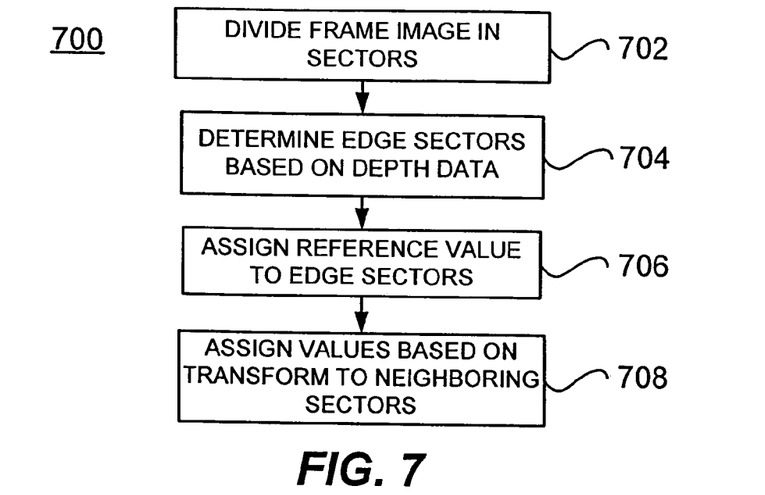
FIG. 7 shows one embodiment of a potential field determination process.

In one embodiment, a potential field is used to simplify the contour fitting process. Now referring to FIG. 7, one embodiment of a potential field determination process 700 for a given frame of a depth video stream is shown. The frame image is divided 702 into segments, (e.g., pixels, sets of pixels, or the like) as for example shown in FIG. 3. The depth data values are compared 704 among segments to determine segments corresponding to the target's edge. For example, segments that when compared to neighboring segments provide a depth differential above a maximum threshold are deemed edge segments. A reference value is assigned 706 to those edge segments and a transform is used to assign 708 values to other segments with respect to the edge segments (e.g., a Manhattan distance transform based on pixel values). The resulting potential field of the depth image can be used for fitting a mathematically representable contour. For example, in one embodiment, gradient vectors can be calculated based on the potential filed.

Figure 8:
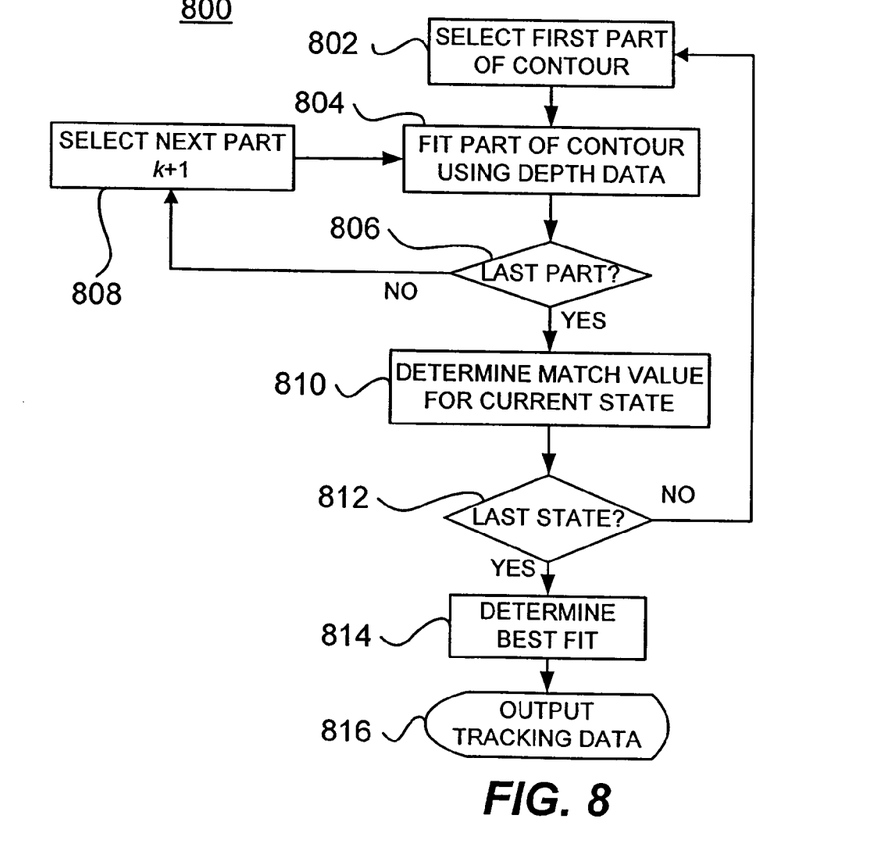
FIG. 8 shows one embodiment of a contour fitting process.

Now referring to FIG. 8, in one embodiment, the contour fitting process 800 for any given frame includes dividing 802 the mathematically representable contour in a number of parts with a fixed orientation. For example, an ellipse can be divided into four arches oriented with the concave sides facing towards the centroids of the ellipse. First, one part is fit 804 using the depth data or potential field data corresponding to a frame of the target's depth video image as described above. Then, for as long as there are parts of the contour left 806, the next part is selected 808 and fit 804 over the target edge as above. When no other parts are left to be fit 806, a match value is calculated 810 for the combination of parts of the contour in a first estimated state. For as long as there are states to check 812, the same process is repeated with each of the states. The match values for each of the states is used for comparison with other match values at different locations or states within the search area S to determine 814 the "best fit" from amongst them for tracking the target. The tracking data is then output 816 and the process is repeated with subsequent frames of the stream.

Figure 9:
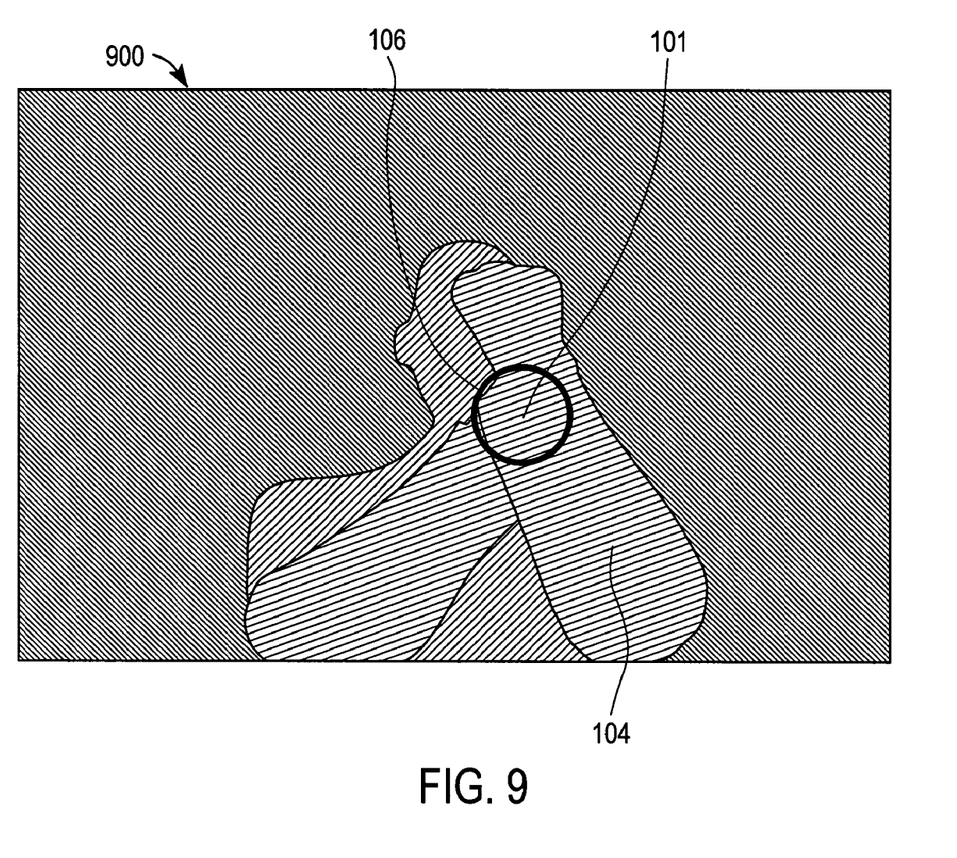
FIG. 9 shows a frame of a complete occlusion state of a target hand being tracked.

In one embodiment, the tracking system has shown robustness against partial and temporary complete occlusions. FIG. 9 shows a frame of a complete occlusion state of a target hand being tracked. In this frame 900, the target hand 101 is entirely behind a non-tracked arm 104. The tracker estimates the position of the target 101 (e.g., shown as the location of circle 106) and catches up with the hand 101 as soon as it becomes slightly visible again (see, e.g., FIG. 1B). The tracker proves to be robust to partial occlusion of the hand 101. In other embodiments, the tracker continues its tracking operation when a passenger's head is occluded by the driver and also operates after a prolonged extreme head tilt by the passenger when he sleeps on the driver's shoulder. In this embodiment, the tracker relies only on shape derived from depth data, therefore unless the occluding object is of generally the same shape, the tracker is able to lock on the tracked target (in case of partial occlusion) or detect the target after complete occlusion. In addition, as described above, in one embodiment the tracking system provides a confidence measure CM, for example, based on its ellipse measure. In this embodiment, the tracker does not drift away during complete occlusions but instead lowers the value of its confidence measure CM for the tracking performance until the occlusion concludes (i.e., a higher confidence measure value is attained).

Body Lean Estimation

One embodiment of a head tracking system includes a body-lean estimator. Body-lean estimation is used for example as an aid for an airbag deployment system. Airbags save thousands of lives worldwide each year but in some instances the airbag deployment can cause injury. Body-lean estimation provides useful information about occupants' positions that can be used for controlling airbag deployment.

In a body-lean estimation system, the tracker's output is used to calculate the mean depth (distance from the camera) of the heads of vehicle occupants. The position of the head is used to determine the general location of the body in the depth image. The depth data corresponding to the body is further used to calculate the mean depth of the body with respect to the camera. These two mean depth values are used to decide the lean of a person (forward, backward or none). If the absolute difference between the distance (mean depth) of the head from the camera and the distance of the body from the camera is more than a fixed threshold, then the person is leaning backward or forward, which can be decided based on the sign of the difference (head at a greater depth implying backward lean and body at a greater depth implying forward lean). As pixel intensities can be translated to real world distance values, choice of threshold is based on real world depth difference, which is used to define body lean.

It should be noted that one benefit of using depth windows with time-of-flight depth sensing cameras includes the ability to use a single camera to track driver and back seat passenger body-lean. For example, for one side of a vehicle (i.e., driver side), a camera can alternate two depth windows to provide two depth image streams one for the driver (closer depth window) and one for the back seat passenger (further depth window) if present. In addition, search area S analysis can include longitudinal divisions of a depth image frame to separate depth information for tracking driver side occupants and front passenger side occupants, for example by splitting the image along its vertical center-line. Thus, depth image streams from a single depth-sensing camera can be used to track at least four regions of a vehicle independently of each other.

Figure 10:
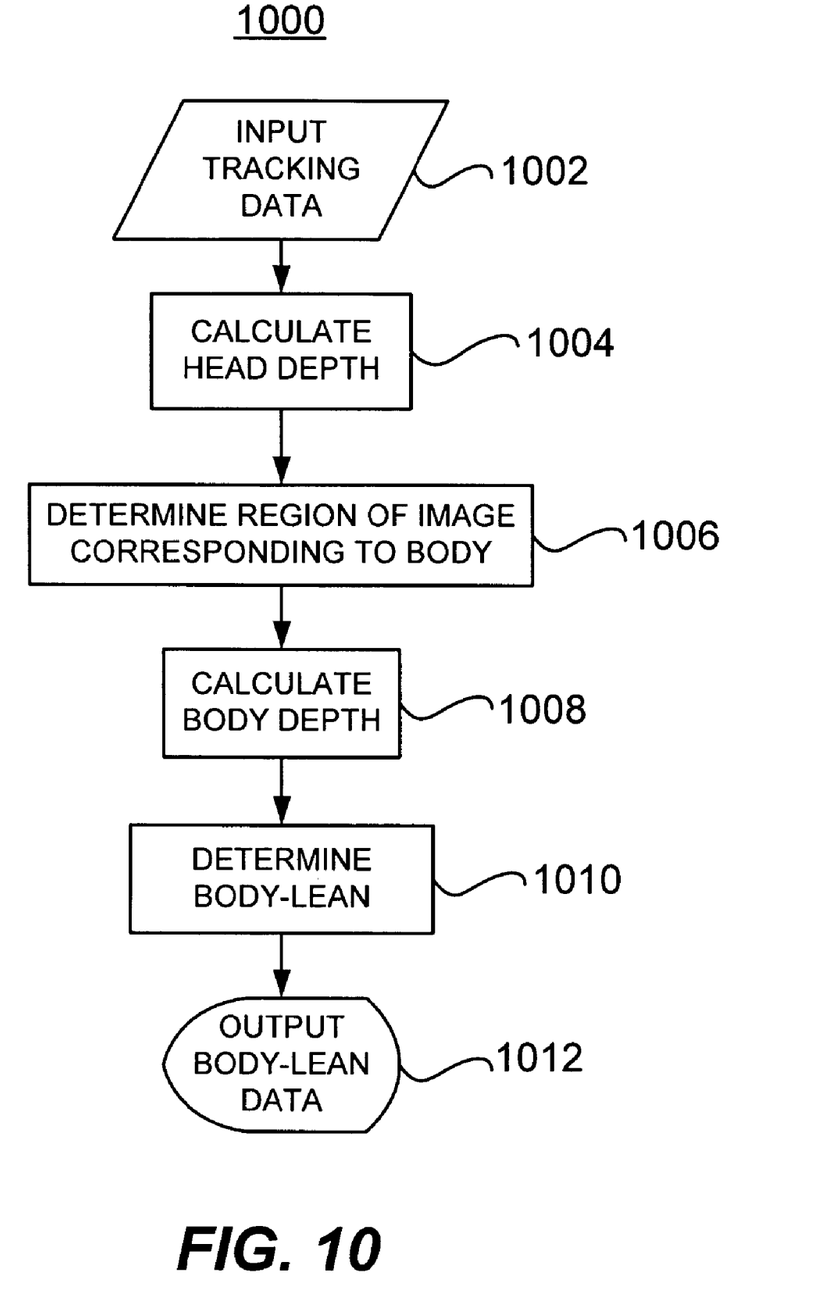
FIG. 10 shows one embodiment of a body-lean estimation method.

Now referring to FIG. 10, a body-lean estimation method is shown. According to one embodiment of this method 1000, to estimate the head depth or distance from the head to the camera, for each frame the tracker provides as an output the current state s of the head with a corresponding fitted contour. For example, an ellipse corresponding to s is superimposed on the depth map. This output is input 1002 for body-lean estimation method 1000. The median of the pixel values inside the contour is chosen as the depth or distance from the camera to the head. Although an average depth value can be used, the median is chosen because of its robustness to noise and outliers. If for some reason, e.g., sudden acceleration, the tracker is not right on target or the contour model does not fit the real shape of the head exactly, median gives us the correct value of the depth if at least half of the pixels inside the contour belong to the head being tracked. This makes the depth estimation system very robust to occasional inaccuracies of the tracker.

To estimate body depth or distance from the body to the camera, based on the position of the head as a reference, connected component analysis is used on the depth map to determine 1006 the region of the image that corresponds to the body of the person whose head is being tracked, i.e., the target. The median of the depth value of this region is calculated 1008 and taken as the body depth or distance from the body to the camera. For reasons discussed above, the choice of median makes the system robust to noise, occlusion and imperfect segmentation.

As mentioned above, the values for median head depth and median body depth are used to decide 1010 the lean of the person (forward, backward or none). The body-lean information is output 1012. For example, in one embodiment the body-lean data is output to a control unit in a vehicle. The output can be communicated either at a particular time based on a predetermined occurrence, or otherwise on a continuous basis for use by the control unit as necessary. The occupant body-lean and general tracking information can be used by a motor vehicle control logic or control unit for several applications, for example, air-bag deployment, collision avoidance, driver assistance, attention detection, and the like.

Hand and Body Tracking

Other applications of a tracking system include hand tracking and recognition including computer based sign language recognition, computer gesture understanding, and the like. One embodiment of a gesture recognition system includes a module for visual instruction recognition in a robot such as the ASIMO humanoid robot referred to above. Other machine vision techniques can be applied to the tracked target image to recognize hand signs, arm motions, or the like. The image recognition techniques can determine correspondence between human actions and computer commands. This embodiment enables a user to give visual hand commands for control of robot actions, for example, making turns, moving, following, staying, and the like.

The tracking of hands and other body parts can also be used in other human-computer interaction applications such as for example, computer gaming, pedestrian detection, or the like. The implementation of these techniques with respect to this applications as well as similar adaptations falls within the scope of this invention.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A human-computer interaction system for visually tracking human movement comprising:
    an active depth sensor for capturing depth images of human body parts;
    a processing unit coupled to the active depth sensor for receiving the depth images, the processing unit comprising:
        an edge detection module configured to determine an edge of a target in the depth images;
        a tracking module coupled to the edge detection module to determine a best fit of a mathematically representable contour with respect to one or more body parts to determine a position of the one or more body parts within the captured depth images at least by:
            dividing the mathematically representable contour into a plurality of segments, each contour segment comprising an inner side corresponding to lower depth values and an outer side corresponding to higher depth values; and
            matching an orientation of each contour segment against a corresponding edge segment of the determined edge in the depth image by comparing the depth values on each side of the determined edge segment and determining that the depth values on a side of the determined depth segment that overlaps with the inner side of the matched contour segment are lower than the depth values of a side of the determined edge segment overlapping with the outer side of the matched contour segment; and
        a body-lean determination module coupled to the tracking module to receive the determined position of the one or more body parts and configured to calculate a distance of each of the one or more body parts with respect to the active sensor and to relate the distance of each body part with respect to other body parts to determine lean data including the position of the body parts with respect to each other.

2. The human-computer interaction system of claim 1, wherein the lean data is sent to a control logic configured to determine whether to deploy an air-bag in a vehicle.

3. The human-computer interaction system of claim 1, wherein the position of the one or more body parts is used to provide user control input to a software application.

4. The human-computer interaction system of claim 3, wherein the software application is a computer game.

5. A motor vehicle configured to track occupant body-lean information, the motor vehicle comprising:
    an active depth sensor for capturing depth images of human body parts;
    a processing unit coupled to the active depth sensor for receiving the depth images, the processing unit comprising:
        an edge detection module configured to determine edges of a target in the depth images; and
        a tracking module coupled to the edge detection module to determine a best fit of a mathematically representable contour with respect to one or more body parts to determine a position of the one or more body parts within the captured depth images at least by:

dividing the mathematically representable contour into a plurality of segments, each contour segment comprising an inner side corresponding to lower depth values and an outer side corresponding to higher depth values; and matching an orientation of each contour segment against a corresponding edge segment of the determined edge in the depth image by comparing the depth values on each side of the determined edge segment and determining that the depth values on a side of the determined depth segment that overlaps with the inner side of the matched contour segment are lower than the depth values of a side of the determined edge segment overlapping with the outer side of the matched contour segment.

6. The motor vehicle of claim 5, further comprising a body-lean determination module coupled to the tracking module to receive the determined position of the one or more body parts and configured to calculate a distance of each of the one or more body parts with respect to the active sensor and to relate the distance of each body part with respect to other body parts to determine lean data including the position of the body parts with respect to each other.

7. The motor vehicle of claim 6, wherein the lean data is sent to a control logic configured to determine whether to deploy an air-bag in the motor vehicle.

* * * * *